(12) United States Patent
Scholler et al.

(10) Patent No.: US 8,411,060 B1
(45) Date of Patent: Apr. 2, 2013

(54) SWIPE GESTURE CLASSIFICATION

(75) Inventors: Jerome F. Scholler, San Francisco, CA (US); Yusuf Ozuysal, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/410,046

(22) Filed: Mar. 1, 2012

Related U.S. Application Data

(60) Provisional application No. 61/586,715, filed on Jan. 13, 2012.

(51) Int. Cl.
*G06F 3/041* (2006.01)
(52) U.S. Cl. .................................................. 345/173
(58) Field of Classification Search .......... 345/173–179; 715/863–866
See application file for complete search history.

(56) References Cited

U.S. PATENT DOCUMENTS

| | | | |
|---|---|---|---|
| 2012/0011438 A1* | 1/2012 | Kim et al. ..................... | 715/702 |
| 2012/0098766 A1* | 4/2012 | Dippel et al. ................. | 345/173 |
| 2012/0102437 A1* | 4/2012 | Worley et al. ................. | 715/863 |
| 2012/0127098 A1* | 5/2012 | Lazaridis et al. ............. | 345/173 |
| 2012/0154303 A1* | 6/2012 | Lazaridis et al. ............. | 345/173 |
| 2012/0180001 A1* | 7/2012 | Griffin et al. ................. | 715/863 |

* cited by examiner

*Primary Examiner* — Dennis Joseph
(74) *Attorney, Agent, or Firm* — McDermott Will & Emery LLP

(57) ABSTRACT

Systems and methods for processing a swipe gesture are provided. A method includes receiving an indication of the swipe gesture via a touch screen. The indication of the swipe gesture includes a first event position on the touch screen associated with a first event time and a second event position associated with a second event time. The method also includes calculating a gesture speed for the swipe gesture. The method also includes calculating a reconstructed event position based on the gesture speed and one of the first event position and the second event position. The method also includes, if the reconstructed event position is closer to the edge than the edge threshold, providing an output associated with taking a first action. The method also includes, if the reconstructed event position is further from the edge than the edge threshold, providing an output associated with taking a second action.

23 Claims, 4 Drawing Sheets

SWIPE GESTURE CLASSIFICATION

CROSS-REFERENCE TO RELATED APPLICATIONS

This application claims priority under 35 U.S.C. §119(e) and the benefit of U.S. Provisional Application No. 61/586,715, filed Jan. 13, 2012, and entitled, "SWIPE GESTURE CLASSIFICATION" the entire disclosure of which is incorporated herein by reference.

FIELD

The subject technology generally relates to touch screen interaction and, in particular, relates to swipe gesture classification.

BACKGROUND

In some touch screen implementations, for example, on mobile phones or tablet computers, swipe gestures, i.e., swiping a finger or a stylus along the touch screen, may be used to denote different types of commands. For example, in a web browser application on a mobile phone, a swipe near an edge of the touch screen may denote a switch tab command, while a swipe further from the edge of the touch screen may denote a scroll within the current tab command. However, swiping near the edge of the touch screen may be difficult for a user, for example, due to the small size of the region near the edge or due to a mobile phone cover precluding access to the edge. As a result, a user of a touch screen may attempt to produce a swipe gesture near the edge of the screen but actually produce a swipe gesture further from the edge of the screen, causing a command different from the desired command to be executed (e.g., causing the web browser to scroll within the current tab rather then causing the web browser to switch tabs). As the foregoing illustrates, a new approach to swipe gesture classification may be desirable.

SUMMARY

The disclosed subject matter relates to a computer-implemented method for processing a swipe gesture. The method includes receiving an indication of the swipe gesture via a touch screen. The indication of the swipe gesture includes a first event position on the touch screen associated with a first event time and a second event position on the touch screen associated with a second event time. The method also includes calculating a gesture speed based on the first event position, the first event time, the second event position, and the second event time. The method also includes calculating a reconstructed event position based on the gesture speed and at least one of the first event position and the second event position. The reconstructed event position is different from the first event position and the second event position. The method also includes determining whether the reconstructed event position is closer to an edge than an edge threshold. The edge may correspond to an edge of the touch screen or an edge displayed within the touch screen. The method also includes if the reconstructed event position is closer to the edge than the edge threshold, providing an output associated with taking a first action. The method also includes if the reconstructed event position is further from the edge than the edge threshold, providing an output associated with taking a second action. The second action is different from the first action.

The disclosed subject matter further relates to a computer-readable medium. The computer-readable medium includes instructions that, when executed by a computer, cause the computer to implement a method for processing a swipe gesture. The instructions include code for receiving an indication of the swipe gesture via a touch screen. The indication of the swipe gesture includes a first event position on the touch screen and a second event position on the touch screen. The instructions also include code for associating the first event position with a first event time. The instructions also include code for associating the second event position with a second event time. The instructions also include code for calculating a gesture speed based on the first event position, the first event time, the second event position, and the second event time. The instructions also include code for calculating a reconstructed event position based on the gesture speed and at least one of the first event position and the second event position. The reconstructed event position is different from the first event position and the second event position. The instructions also include code for determining whether the reconstructed event position is closer to an edge than an edge threshold distance. The edge may correspond to an edge of the touch screen or an edge displayed within the touch screen. The instructions also include code for, if the reconstructed event position is closer to the edge than the edge threshold distance, providing an output associated with taking a first action. The instructions also include code for, if the reconstructed event position is further from the edge than the edge threshold distance, providing an output associated with taking a second action. The second action is different from the first action.

The disclosed subject matter further relates to a system. The system includes one or more processors. The system also includes a memory that includes instructions that, when executed by the one or more processors, cause the one or more processors to implement a method for processing a swipe gesture. The instructions include code for receiving an indication of the swipe gesture via a touch screen displaying a web browser window. The indication of the swipe gesture includes a first event position on the touch screen associated with a first event time and a second event position on the touch screen associated with a second event time. The instructions also include code for calculating a gesture speed based on the first event position, the first event time, the second event position, and the second event time. The instructions also include code for calculating a reconstructed event position based on the gesture speed and at least one of the first event position and the second event position. The reconstructed event position is different from the first event position and the second event position. The instructions also include code for determining whether the reconstructed event position is closer to an edge of the web browser window than an edge threshold. The instructions also include code for, if the reconstructed event position is closer to the edge than the edge threshold, providing an output associated with switching a tab of the web browser window. The instructions also include code for, if the reconstructed event position is further from the edge than the edge threshold, providing an output associated with scrolling along an axis within a single tab of the web browser window.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
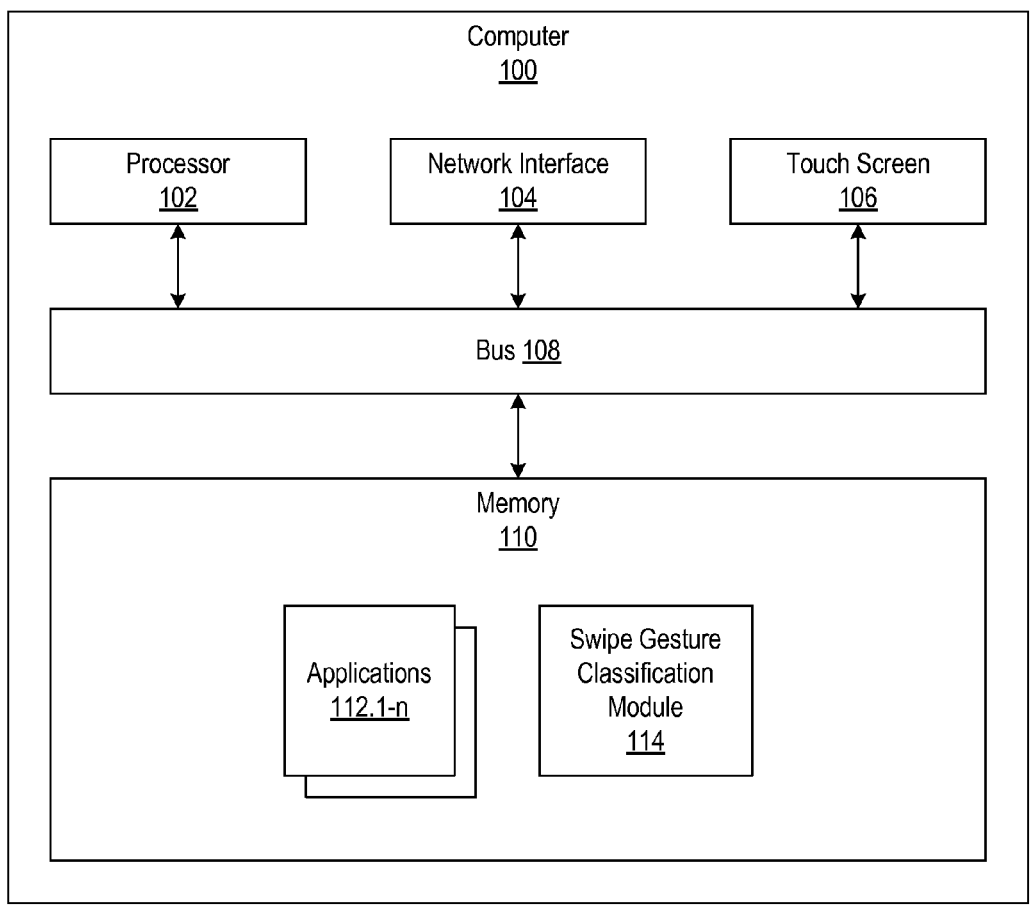
FIG. 1 illustrates an example of a computer system configured to implement swipe gesture classification.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to classifying and processing or responding to a swipe gesture received via a touch screen. The swipe gesture may include, for example, swiping a finger or a stylus along the touch screen. A computer (e.g., a mobile phone or a tablet computer with a touch screen) may receive an indication of the swipe gesture via a touch screen. The indication of the swipe gesture may include a first event position (e.g., point in a region touched by the user's finger or stylus) on the touch screen associated with a first event time and a second event position on the touch screen associated with a second event time. The computer may calculate a gesture speed based on the first event position, the first event time, the second event position, and the second event time. The computer may calculate calculating a reconstructed event position based on the gesture speed and at least one of the first event position and the second event position. The reconstructed event position may be different from the first event position and the second event position and may not be a part of the received indication of the swipe gesture. The computer may determine whether the reconstructed event position is closer to an edge (e.g., an edge of the touch screen) than an edge threshold. The edge threshold may be measured in units of distance (e.g., 0.5 cm), in pixels (e.g., 20 pixels), or as a percentage of the screen size (e.g., 5%). If the reconstructed event position is closer to the edge than the edge threshold, the computer may providing an output associated with taking a first action. If the reconstructed event position is further from the edge than the edge threshold, the computer may providing an output associated with taking a second action. The second action may be different from the first action. For example, if the computer is displaying a web browser window with multiple tabs, the first action, taken if the reconstructed event position is closer to the edge than the edge threshold, may correspond to switching a tab of the web browser window. The second action, taken if the reconstructed event position is further to the edge than the edge threshold, may correspond to scrolling along an axis within a single tab of the web browser window.

Advantageously, the subject technology may address a problem where a user of a device with a touch screen may attempt to enter a swipe gesture near an edge of the touch screen but hardware or software associated with sensors on the touch screen fail to detect the touch gesture or the user fails to allow his/her finger to "touch down" on the touch screen near the edge, for example, due to the small size of the edge, obstruction by a cover of the device, or imprecise hand movements. Gestures initiated near an edge of a screen typically involve higher gesture speeds further from the edge due to the acceleration of the finger or stylus. Thus, the gesture speed and event positions in the gesture may be used to determine whether the gesture was intended by the user to be close to the edge (e.g., less than 0.4 cm from the edge) or far from the edge (e.g., more than 0.4 cm from the edge).

FIG. 1 illustrates an example of a computer system 100 configured to implement swipe gesture classification.

The computer system 100 may correspond to a laptop computer, a desktop computer, a mobile phone, a tablet computer, a personal digital assistant, a portable audio player, a television coupled to one or more processors, etc. As shown, the computer system 100 includes a processor 102, a network interface 104, a touch screen 106, a bus 108, and a memory 110. The processor 102 is configured to execute computer instructions that are stored in a computer-readable medium, for example, the memory 110. The processor may be a central processing unit (CPU). While only one processor 102 is illustrated in FIG. 1, the subject technology may be implemented with one or more processors. The network interface 104 is configured to allow the computer system 100 to transmit and receive data in the network (e.g., a cellular network, a wireless local area network, a wired local area network, or the Internet). The network interface 104 may include one or more network interface cards (NICs). The touch screen 106 may be configured to display data, for example, graphical components including text, images, or videos, within a display area. The touch screen 106 may be configured to detect the presence and location of touch within the display area. The touch may be via a human finger or hand or via another object, e.g., a stylus. The touch screen 106 may be a single touch screen or a multi-touch screen. The touch screen 106 may be configured to detect swipe gestures. The phrase "swipe gesture," as used herein, encompasses its plain and ordinary meaning including, but not limited to, an initial touching on a screen by a touching object, e.g., a finger or a stylus, followed by dragging the touching object along the screen. The bus 108 may be configured to transfer data or instructions between components within the computer system 100. For example, the bus 108 may be configured to transfer data or instructions between the processor 102, the network interface 104, the touch screen 106, and the memory 110. The memory 110 stores data and instructions. As illustrated, the memory stores one or more applications 112.1-*n* and a swipe gesture classification module 114. While only a single memory 110 is illustrated in FIG. 1, the subject technology may be implemented in conjunction with multiple separate memory components connected to one another via a bus (e.g., bus 108).

The applications 112.1-*n* may include any known applications. Example applications may include a web browser application, an audio call application, a video call application, a text messaging application, a word processing application, an image or photograph viewing application, a video player application, etc. The subject technology may be implemented in conjunction with any application, including an application that includes displaying content that is larger than the size of the touch screen 106. One or more of the applications 112.1-*n* may include instructions for interfacing with a user via a touch screen (e.g., touch screen 106). One or more of the applications 112.1-*n* may include instructions to take a first action in response to a swipe gesture near an edge (e.g., a swipe gesture that includes at least one point within 0.3 cm of the edge) and instructions to take a second action, different from the first action, in response to a swipe gesture far from the edge (e.g., a swipe gesture that does not include a point within 0.3 cm of the edge). As used herein, the term "edge" encompasses its plain and ordinary meaning including, but not limited to, a border of a touch screen, a border of an application window, where at least a portion of the application window is displayed within the touch screen, or a border of an object within a window, where at least a portion of the object is displayed within the touch screen. The object may be, for example, a button within the application window or a map within the application window.

The swipe gesture classification module 114 may include instructions for classifying a swipe gesture. The swipe gesture classification module 114 may include instructions for receiving an indication of a swipe gesture via a touch screen (e.g., touch screen 106). The indication of the swipe gesture may include a first event position on the touch screen associated with first event time and a second event position on the touch screen associated with a second event time. The phrase "event position," as used herein, encompasses its plain and ordinary meaning, including, but not limited to, a region on a touch screen that is touched by a touching object, e.g., a finger or a stylus, at a certain time (the "event time"). The region may be represented as a point, e.g., a point at the center of the region, a point at the center of gravity of the region, or a point on the border of the region. The swipe gesture classification module 114 may also include instructions for calculating a gesture speed based on the first event position, the first event time, the second event position, and the second event time. The gesture speed s may be calculated according to equation (1) below.

$$s=(x_2-x_1)/(t_2-t_1) \quad (1)$$

In equation (1), s represents the gesture speed. The first event position, first event time, second event position, and second event time are represented as $x_1$, $t_1$, $x_2$, and $t_2$, respectively. If the touch screen (e.g., touch screen 106) is a two-dimensional screen, the first event position and second event position, $x_1$ and $x_2$, may include the positions in only a single coordinate axis (e.g., the horizontal coordinate axis or the vertical coordinate axis) or represent vectors in both coordinate axes.

The swipe gesture classification module 114 may also include instructions for calculating a reconstructed event position based on the gesture speed and at least one of the first event position and the second event position. The reconstructed event position may be different from the first event position and the second event position. In one example, the reconstructed event position $x_r$ may be calculated by adding or subtracting a reconstructed displacement to at least one of the first event position and the second event position according to equation (2) below.

$$x_r=x_1-\delta_r \quad (2)$$

In equation (2), $x_1$ represents the first event position, $x_r$ represents the reconstructed event position, and $\delta_r$ represents the reconstructed displacement. If the touch screen (e.g., touch screen 106) is a two-dimensional screen, the first event position, the reconstructed event position, and the reconstructed displacement, $x_1$, $x_r$, and $\delta_r$ may include the positions or displacements in only a single coordinate axis (e.g., the horizontal coordinate axis or the vertical coordinate axis) or represent position or displacement vectors in both coordinate axes.

In some implementations, the reconstructed displacement $\delta_r$ may be calculated according to equation (3) or equation (4) below.

$$\delta_r=T*s \quad (3)$$

$$\delta_r=\text{sign}(s)*A*(\exp(\text{abs}(s))-1) \quad (4)$$

In equation (3) and equation (4), s represents the gesture speed as defined, for example, in equation (1). T represents the sensor sampling time of the touch screen (e.g., touch screen 106). For example, T may correspond to an amount of time required for one sample by the touch screen. In one example implementation, the sampling rate may be 1/30 seconds. A represents a constant value for a specific touch screen (e.g., touch screen 106). Among different touch screens, the value of A may vary based on the pixel density of the touch screen or the dimensions (length or width) of the touch screen. The value of A may be inversely proportional to the pixel density of the touch screen. The pixel density may be measured as a number of pixels per unit length, e.g., pixels per inch. The sign function, sign(s) encompasses its plain and ordinary meaning. According to one implementation, The sign function, sign(s), may return −1 if s<0, 0 if s=0, or 1 if s>0. According to another implementation, sign(s) may return 1 if the motion is in a specified direction (e.g., upward or to the right) or −1 if the motion is in an opposite direction of the specified direction (e.g., downward or to the left). The exp function, as used herein, encompasses its plain and ordinary meaning including but not limited to the exponential function, where exp(k) means e^k or e raised to the power of k. e is a constant equal to 2.718281828, when rounded to ten significant figures. The abs function, as used herein, encompasses its plain and ordinary meaning including but not limited to the absolute value function or the magnitude function. The absolute value of a number is equal to −1 multiplied by the number if the number is less than zero, or the number itself if the number is greater than or equal to zero. The magnitude function may calculate the magnitude of a vector, i.e., the length of a displacement vector or the speed of a movement vector.

The reconstructed displacement $\delta_r$ may depend on the gesture speed s because users of touch screens typically move their fingers or styli faster when moving from a point close to the edge to a point further from the edge (due to increasing the velocity of the finger or the stylus during the motion) than when moving between two points far from the edge. In one example, a user of a touch screen may start a motion of a finger or stylus close to the edge but fail to "touch down" the finger or stylus until the finger or stylus is far from the edge of the touch screen. The failure to "touch down" may be caused by a protective cover surrounding the touch screen or by the inattention or inexperience with touch screen devices of the user.

In one example, for a mobile phone having a touch screen with a four inch diagonal, the value of the constant A is calculated according to equation (5) below.

$$A=6500/(320*dp) \quad (5)$$

In equation (5), dp represents the pixel density of the touch screen, as measured in pixels per inch (PPI) divided by 160. In other words, dp may be calculated according to equation (6) below.

$$dp = dpi/160 \qquad (6)$$

In equation (6) dpi represents the number of pixels per inch on the touch screen. One example touch screen of a mobile phone implementing the subject technology may have dpi=240. Another example touch screen of a mobile phone implementing the subject technology may have dpi=320. If equation (5) is implemented, the reconstructed displacement $\delta_r$ may be measured in pixels.

Equation (5) and equation (6) represent one approach to calculating the constant A based on dp. In other implementation, A may not depend on dp. Alternatively, A may be directly proportional to dp rather than inversely proportional.

Equation (7), presented below, may be derived from equation (5) and equation (6) to obtain the value of the constant A directly from the value of dpi.

$$A = 6500/(2*dpi) \qquad (7)$$

The swipe gesture classification module 114 may also include instructions for determining whether the reconstructed event position $x_r$ is closer to an edge (e.g., of the touch screen, of a window in the touch screen, or of an object in the window in the touch screen) than an edge threshold. The edge threshold may be measured in units of distance (e.g., 1 cm) or in units of pixels (e.g., 20 pixels). If the reconstructed event position $x_r$ is closer to the edge than the edge threshold, the swipe gesture classification module 114 may provide an output associated with taking a first action (e.g., in a web browser application, switching a tab of the web browser window). If the reconstructed event position $x_r$ is further to the edge than the edge threshold, the swipe gesture classification module 114 may provide an output associated with taking a second action (e.g., in a web browser application, scrolling along an axis within a single tab of the web browser window). The second action may be different from the first action.

Figure 2:
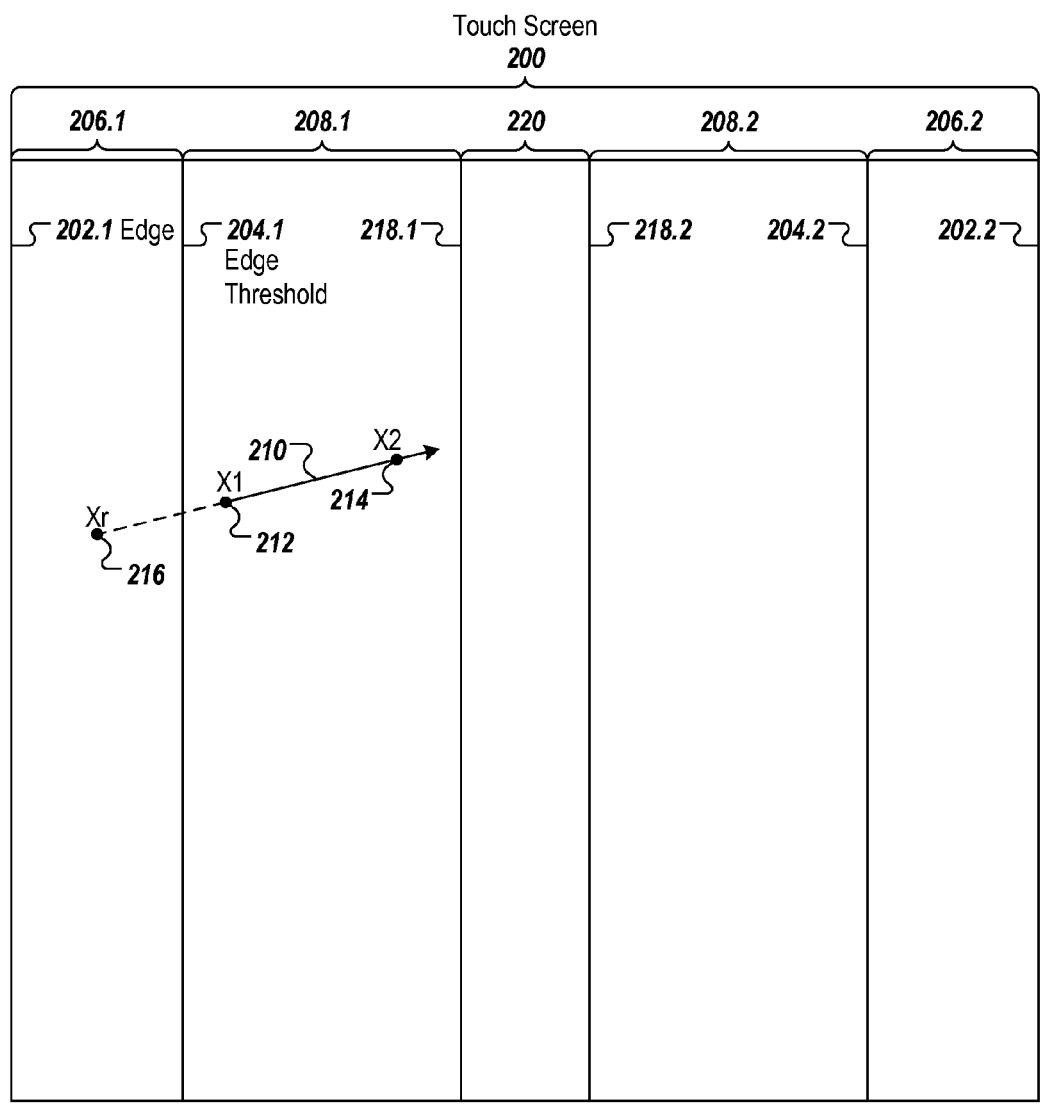
FIG. 2 illustrates an example of a touch screen within a computer system implementing swipe gesture classification.

FIG. 2 illustrates an example of a touch screen 200 within a computer system (e.g., computer system 100) implementing swipe gesture classification. The touch screen 200 may correspond to the touch screen 106 of FIG. 1.

As shown, the touch screen 200 includes left and right edges 202.1 and 202.2, respectively. While the subject technology is illustrated in FIG. 2 with respect to left and right edges 202.1 and 202.2, the subject technology may also be implemented with respect to top and bottom edges or any other edges. The touch screen 200 also includes left and right edge threshold lines 204.1 and 204.2, respectively, and left and right center threshold lines 218.1 and 218.2, respectively. The edge threshold lines 204.1 and 204.1 may be an edge threshold distance away from the respective edges 202.1 and 202.2 and may be parallel to the edges 202.1 and 202.2. The center threshold lines 218.1 and 218.2 may be parallel to the edges 202.1 and 202.2. The edge threshold lines 204.1 and 204.2 and the center threshold lines 218.1 and 218.2 may separate the touch screen into close-to-edge regions 206.1 and 206.2, far-from-edge regions 208.1 and 208.2 center region 220.

In one example, the touch screen 200 may have a diagonal length of four inches and a pixel density of either dpi=240 pixels per inch or dpi=320 pixels per inch. The edge threshold may be 6.4*dp, with dp defined according to equation (6) set forth above. The left center threshold line 218.1 may be a distance of 48*dp to the right of the left edge 202.1. The right center threshold line 218.2 may be a distance of 48*dp to the left of the right edge 202.2. (FIG. 2 may not be drawn to scale.)

A user of the touch screen 200 may make a swipe gesture on the touch screen 200, for example, a swipe gesture associated with swipe gesture path 210. The swipe gesture path 210 may include first event position $x_1$ 212 and second event position $x_2$ 214. The user may have touched first event position $x_1$ 212 at time $t_1$ and second event position $x_2$ 214 at time $t_2$.

Based on the values of $x_1$ 212, $x_2$ 214, $t_1$, and $t_2$ derived from the swipe gesture path 210, the reconstructed event position $x_r$ 216 may be derived, for example, using equations (1)-(7) as set forth above. As illustrated, the reconstructed event position $x_r$ 216 falls within the close-to-edge region 206.1. Thus, an action associated with a swipe gesture close to the edge 202.1 may be taken in response to the swipe gesture that created swipe gesture path 210. Had the reconstructed event position $x_r$ 216 fallen within the far-from-edge regions 208.1 or 208.2, an action associated with a swipe gesture far from the edges 202.1 and 202.2 may have been taken in response to the swipe gesture that created swipe gesture path 210. As illustrated, $x_r$ 216 is collinear with $x_1$ 212 and $x_2$ 214. However, in some implementations, $x_r$ 216 may not be collinear with $x_1$ 212 and $x_2$ 214. Instead, an arc or another extrapolation scheme may be used to determine the position of $x_r$ 216 based on the positions of $x_1$ 212 and $x_2$ 214.

It should be noted that a finger or a stylus touching a touch screen (e.g., touch screen 200) may create a two-dimensional region rather than a point that was touched at any specific time (e.g., time $t_1$ or time $t_2$). However, the region may be represented as a point, for example, a point in the center of the region, a point in the center of gravity of the region, or a point on the border of the region.

In one example, if either the first event position $x_1$ 212 or the second event position $x_2$ 214 is within the close-to-edge regions 206.1 or 206.2, an action associated with a swipe gesture close to the edge 202.1 or 202.2 may be taken regardless of the reconstructed event position $x_r$ 216 or the reconstructed event position $x_r$ 216 may not be calculated. If the earlier in time one of the first event position $x_1$ 212 and the second event position $x_2$ 214 is within the center region 220 an action associated with a swipe gesture far from the edges 202.1 and 202.2 may be taken regardless of the reconstructed event position $x_r$ 216 or the reconstructed event position $x_r$ 216 may not be calculated. (E.g., If the first event position $x_1$ 212 occurred earlier in time than the second event position $x_2$ 214, then $x_1$ 212 is the earlier in time one of $x_1$ 212 and $x_2$ 214.) However, if the first event position $x_1$ 212 and the second event position $x_2$ 214 are within the far-from-edge regions 208.1 and 208.2, the reconstructed event position $x_r$ 216 may be calculated and an action may be taken based on the reconstructed event position $x_r$ 216.

As illustrated in FIG. 2, two event positions $x_1$ 212 and $x_2$ 214 are used to calculate the reconstructed event position $x_r$ 216. However, in an alternative implementation, the reconstructed event position $x_r$ 216 may be calculated based on two or more event positions on the swipe gesture path 210, a portion of the swipe gesture path 210, or the entire swipe gesture path 210.

Figure 3:
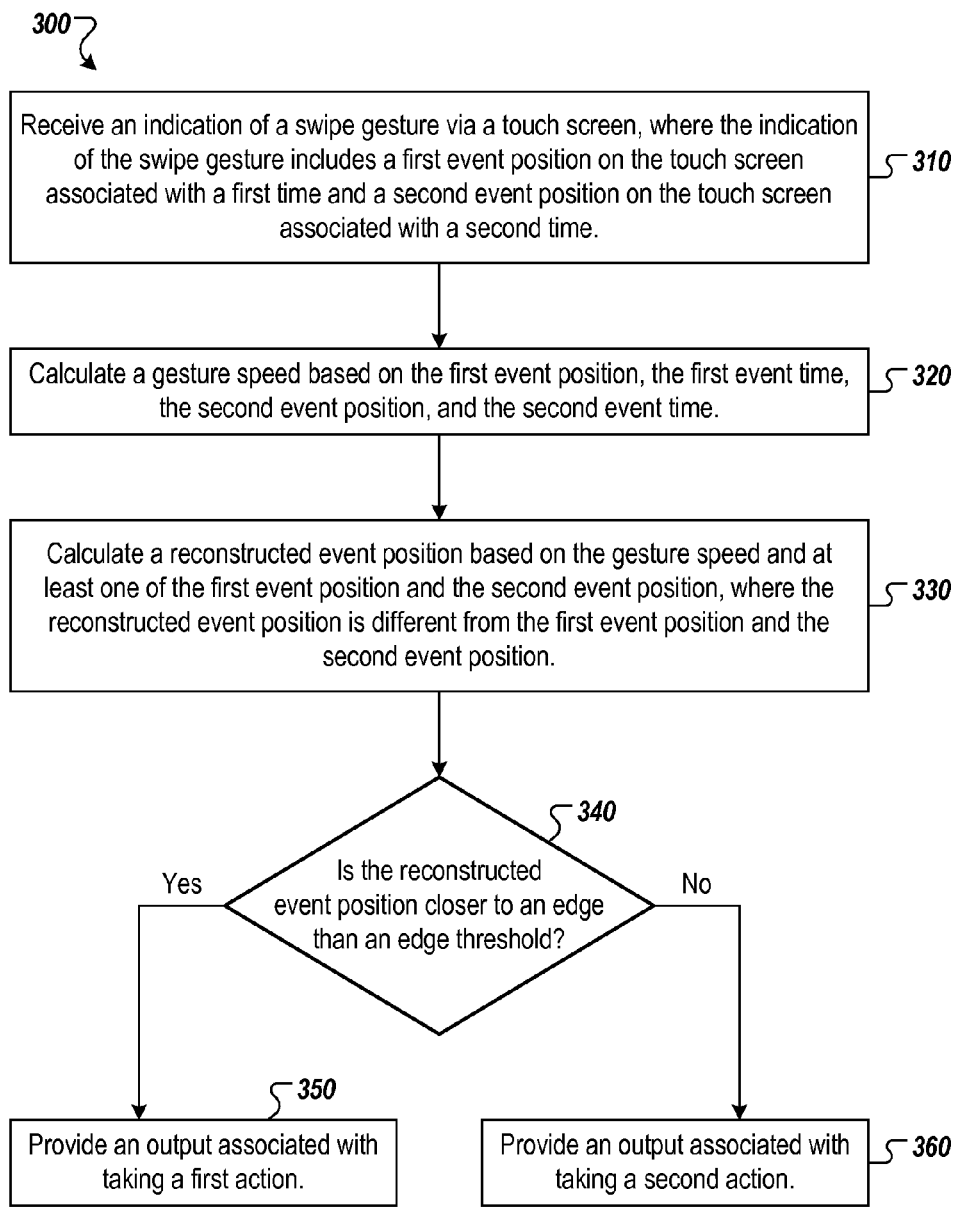
FIG. 3 illustrates an example process by which a swipe gesture may be classified.

FIG. 3 illustrates an example process 300 by which a swipe gesture may be classified.

The process 300 begins at step 310, where a computer (e.g., computer 100) receives an indication of a swipe gesture (e.g., swipe gesture path 210) via a touch screen. The indication of the swipe gesture may include a first event position on the touch screen (e.g., first event position $x_1$ 212) associated with a first event time (e.g., $t_1$) and a second event position (e.g., second event position $x_2$ 214) on the touch screen associated with a second event time (e.g., $t_2$). In one implementation, the computer may associate the first event position with the first event time or the second event position with the second event time.

In step 320, the computer calculates a gesture speed based on the first event position, the first event time, the second event position, and the second event time. The computer may calculate the gesture speed according to equation (1) set forth above, or using any other approach.

In step 330, the computer calculates a reconstructed event position (e.g., reconstructed event position $x_r$ 216) based on the gesture speed and at least one of the first event position and the second event position. The reconstructed event position may be different from the first event position and the second event position. The reconstructed event position may correspond to a position that is not included in the indication of the swipe gesture (e.g., swipe gesture path 210) received in step 310. The computer may calculate the reconstructed event position according to equations (1)-(7) set forth above, or using any other approach.

In one example, the computer may calculate the reconstructed event position by calculating a reconstructed displacement based on the gesture speed and adding or subtracting the reconstructed displacement to one of the first event position and the second event position. The reconstructed displacement may depend on the gesture speed in order to predict a likely previous position (the reconstructed event position) associated with the swipe gesture. The exponential function may be used because as the speed of the gesture increases, the prediction may become less accurate and more inclusivity may be desirable.

In step 340, the computer determines whether the reconstructed event position is closer to an edge than an edge threshold. The edge may correspond to a horizontal edge, a vertical edge, or both the horizontal edge and the vertical edge. The edge may correspond to an edge of the touch screen. Alternatively, the edge may correspond to an edge displayed within the touch screen, for example, an edge of a window, where at least a portion of the window is displayed within the touch screen. The edge may correspond to an edge of an object (e.g., a button or a map) within a window, where at least a portion of the object is displayed within the touch screen. The edge threshold may be determined based on a size (in units of distance) of the touch screen. Alternatively, the edge threshold may be independent of the size of the touch screen.

If the reconstructed event position is closer to the edge than the edge threshold, the process 300 continues to step 350, where the computer provides an output associated with taking a first action. After step 350, the process 300 ends.

If the reconstructed event position is not closer to the edge than the edge threshold, the process 300 continues to step 360, where the computer provides an output associated with taking a second action. The second action may be different from the first action.

The first action or the second action may be determined based on an application running on the computer and displaying data on the touch screen. For example, a web browser application may be running on the computer and the touch screen may display a web browser window including multiple tabs. The first action, to be taken if the reconstructed event position is closer to the edge than the edge threshold, may correspond to switching a tab of the web browser window. However, the second action, to be taken if the reconstructed event position is not closer to the edge than the edge threshold, may correspond to scrolling along an axis (e.g., a horizontal axis) within a single tab of the web browser window. After step 360, the process 300 ends.

Figure 4:
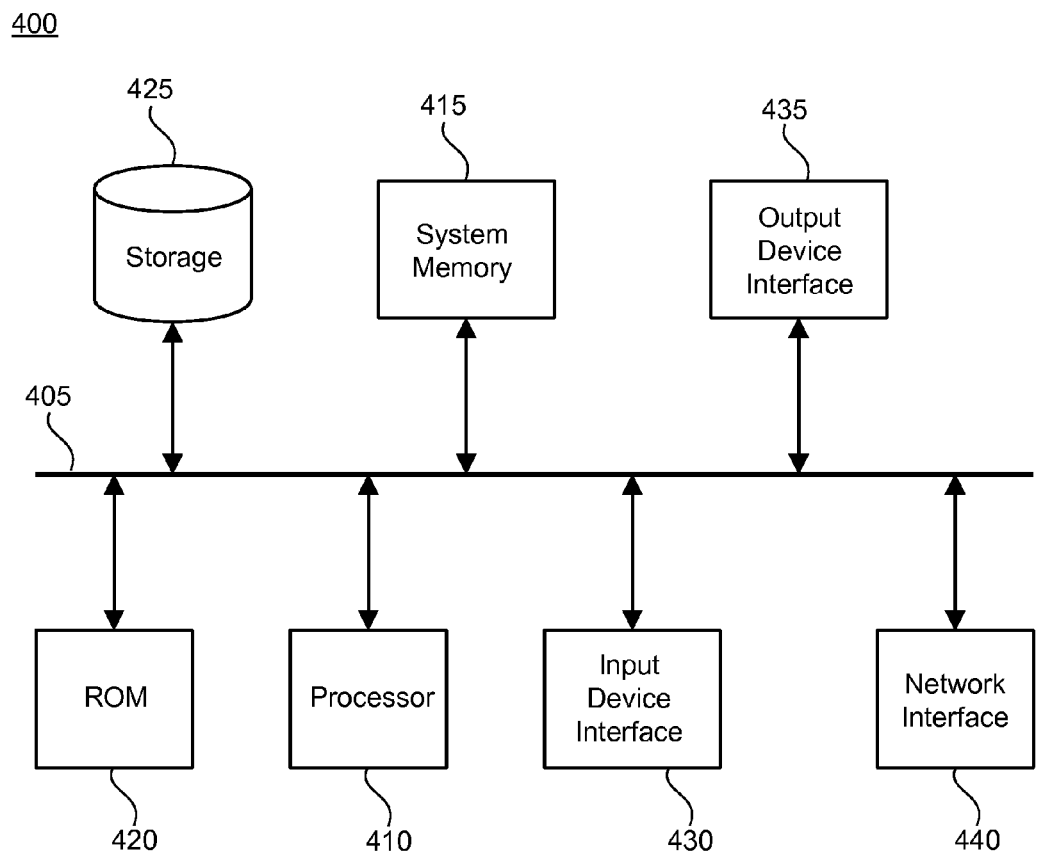
FIG. 4 conceptually illustrates an example electronic system with which some implementations of the subject technology are implemented.

FIG. 4 conceptually illustrates an electronic system 400 with which some implementations of the subject technology are implemented. For example, the computer 100 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for swipe gesture classification in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example touch screen display devices. Some implementations include devices, for example a touch screen, that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for processing a swipe gesture, the method comprising:
   receiving an indication of the swipe gesture via a touch screen, wherein the indication of the swipe gesture comprises a first event position on the touch screen associated with a first event time and a second event position on the touch screen associated with a second event time;
   calculating a gesture speed based on the first event position, the first event time, the second event position, and the second event time;
   calculating a reconstructed event position based on the gesture speed and at least one of the first event position and the second event position, wherein the reconstructed event position is different from the first event position and the second event position and is not received in the indication of the swipe gesture, and wherein the reconstructed event position is a mathematically derived point on two coordinate axes;
   wherein calculating the reconstructed event position comprises calculating a reconstructed displacement based on the gesture speed; and
   adding or subtracting the reconstructed displacement to the at least one of the first event position and the second event position;
   wherein the reconstructed event position is calculated according to an equation, wherein the equation comprises an exponential function of the gesture speed;
   determining whether the reconstructed event position is closer to an edge than an edge threshold, the edge corresponding to an edge of the touch screen or an edge displayed within the touch screen;
   if the reconstructed event position is closer to the edge than the edge threshold, providing an output associated with taking a first action in an application; and
   if the reconstructed event position is further from the edge than the edge threshold, providing an output associated with taking a second action in the application, wherein the second action is different from the first action.

2. The method of claim 1, wherein the reconstructed displacement is calculated according to an equation:

$$\text{reconstructed displacement} = \text{sign}(\text{gesture speed}) * \text{constant} * (\exp(\text{abs}(\text{gesture speed})) - 1),$$

wherein the constant is based on a pixel density of the touch screen, wherein the pixel density comprises a number of pixels per unit distance,
wherein sign represents a sign function,
wherein exp represents an exponential function, and
wherein abs represents an absolute value function or a magnitude function.

3. The method of claim 2, wherein the constant is inversely proportional to the pixel density of the touch screen.

4. The method of claim 3, wherein the constant is calculated according to an equation:

$$\text{constant} = 6500/(2 * \text{pixel density}),$$

wherein the pixel density is measured in pixels per inch (PPI), and
wherein the reconstructed displacement is measured in inches.

5. The method of claim 1, wherein the edge comprises an edge of a window, wherein at least a portion of the window is displayed within the touch screen.

6. The method of claim 1, wherein the edge comprises an edge of an object within a window, wherein at least a portion of the object is displayed within the touch screen.

7. The method of claim 1, wherein the edge threshold is measured in pixels.

8. The method of claim 1, wherein the edge threshold is measured in units of distance.

9. The method of claim 1, wherein the edge threshold is measured as a percentage of a size of the touch screen.

10. The method of claim 1, wherein the touch screen displays a web browser window.

11. The method of claim 10, wherein the first action comprises switching a tab of the web browser window.

12. The method of claim 10, wherein the second action comprises scrolling along an axis within a single tab of the web browser window.

13. A non-transitory computer-readable medium for processing a swipe gesture, the computer-readable medium comprising instructions instruction which, when executed by a computer, cause the computer to:
receive an indication of the swipe gesture via a touch screen, wherein the indication of the swipe gesture comprises a first event position on the touch screen and a second event position on the touch screen;
associate the first event position with a first event time;
associate the second event position with a second event time;
calculate a gesture speed based on the first event position, the first event time, the second event position, and the second event time;
calculate a reconstructed event position based on the gesture speed and at least one of the first event position and the second event position, wherein the reconstructed event position is different from the first event position and the second event position and is not included in the received indication of the swipe gesture, wherein the reconstructed event position is a mathematically derived point on two coordinate axes;
wherein calculating the reconstructed event position comprises calculating a reconstructed displacement based on the gesture speed; and
adding or subtracting the reconstructed displacement to the at least one of the first event position and the second event position;
wherein the reconstructed event position is calculated according to an equation, wherein the equation comprises an exponential function of the gesture speed;
determine whether the reconstructed event position is closer to an edge than an edge threshold distance, the edge corresponding to an edge of the touch screen or an edge displayed within the touch screen;
if the reconstructed event position is closer to the edge than the edge threshold distance, provide an output associated with taking a first action in an application displaying data on the touch screen; and
if the reconstructed event position is further from the edge than the edge threshold distance, provide an output associated with taking a second action in the application displaying data on the touch screen, wherein the second action is different from the first action.

14. The non-transitory computer-readable medium of claim 13, wherein the edge threshold is measured as a percentage of a size of the touch screen.

15. The non-transitory computer-readable medium of claim 13, wherein at least one of the first action or the second action is determined based on an application running on the computer and displaying data on the touch screen.

16. The non-transitory computer-readable medium of claim 15, wherein the application comprises a web browser.

17. The non-transitory computer-readable medium of claim 16, wherein the first action comprises switching a tab of the web browser.

18. The non-transitory computer-readable medium of claim 16, wherein the second action comprises scrolling along an axis within a single tab of the web browser.

19. A system for processing a swipe gesture, the system comprising:
one or more processors; and
a memory comprising instructions which, when executed by the one or more processors, cause the one or more processors to:
receive an indication of the swipe gesture via a touch screen displaying a web browser window, wherein the indication of the swipe gesture comprises a first event position on the touch screen associated with a first event time and a second event position on the touch screen associated with a second event time;
calculate a gesture speed based on the first event position, the first event time, the second event position, and the second event time;
calculate a reconstructed event position based on the gesture speed and at least one of the first event position and the second event position, wherein the reconstructed event position is different from the first event position and the second event position and is not included in the received indication of the swipe gesture, and wherein the reconstructed event position comprises a mathematically derived point on two coordinate axes;
wherein calculating the reconstructed event position comprises calculating a reconstructed displacement based on the gesture speed; and
adding or subtracting the reconstructed displacement to the at least one of the first event position and the second event position;
wherein the reconstructed event position is calculated according to an equation, wherein the equation comprises an exponential function of the gesture speed;
determine whether the reconstructed event position is closer to an edge of the web browser window than an edge threshold;
if the reconstructed event position is closer to the edge than the edge threshold, provide an output associated with switching a tab of the web browser window; and
if the reconstructed event position is further from the edge than the edge threshold, provide an output associated with scrolling along an axis within a single tab of the web browser window.

20. The system of claim 19, wherein the gesture speed is calculated according to an equation:

gesture speed=(second event position−first event position)/(second event time−first event time).

21. The system of claim 19, wherein the instructions to calculate the reconstructed event position comprise instructions which, when executed by the one or more processors, cause the one or more processors to:
calculate a reconstructed displacement based on the gesture speed; and
add or subtract the reconstructed displacement to the at least one of the first event position and the second event position.

22. The system of claim 21, wherein the reconstructed displacement is calculated according to an equation:

reconstructed displacement=sign(gesture speed)*constant*(exp(abs(gesture speed))−1), wherein the constant is based on a pixel density of the touch screen, wherein the pixel density comprises a number of pixels per unit distance,
wherein sign represents a sign function,
wherein exp represents an exponential function, and
wherein abs represents an absolute value function or a magnitude function.

23. The system of claim 21, wherein the reconstructed displacement is calculated according to an equation:

reconstructed displacement=sample time*gesture speed, wherein the sample time comprises an amount of time required for a sample by the touch screen.

* * * * *

UNITED STATES PATENT AND TRADEMARK OFFICE
CERTIFICATE OF CORRECTION

PATENT NO. : 8,411,060 B1
APPLICATION NO. : 13/410046
DATED : April 2, 2013
INVENTOR(S) : Jerome F. Scholler et al.

It is certified that error appears in the above-identified patent and that said Letters Patent is hereby corrected as shown below:

IN THE CLAIMS:

In Column 15, Line 3

Replace "instructions instruction which", with --instructions which--.

Signed and Sealed this
Thirteenth Day of August, 2013

Teresa Stanek Rea
*Acting Director of the United States Patent and Trademark Office*